US012783831B2

(12) United States Patent
Yen et al.

(10) Patent No.: US 12,783,831 B2
(45) Date of Patent: Nov. 3, 2026

(54) RETAIL STORE ENTRY AND SIGN-IN SYSTEM USING A LOCATION OF A WIRELESS DEVICE

(71) Applicant: Toshiba Global Commerce Solutions, Inc., Durham, NC (US)

(72) Inventors: Jennifer Yen, Morrisville, NC (US); Charles R. Kirk, Raleigh, NC (US); Srija Ganguly, Raleigh, NC (US); Viktor Ivakhno, Cary, NC (US); Tracy Cate, Durham, NC (US); Artem Nagoga, Raleigh, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 0 days.

(21) Appl. No.: 18/796,854

(22) Filed: Aug. 7, 2024

(65) Prior Publication Data

US 2026/0044694 A1 Feb. 12, 2026

(51) Int. Cl.
*G06K 7/14* (2006.01)
*H04W 4/021* (2018.01)

(52) U.S. Cl.
CPC ........... *G06K 7/1404* (2013.01); *H04W 4/021* (2013.01)

(58) Field of Classification Search
CPC ..... H04W 4/021; H04W 4/025; H04W 4/029; G07C 9/00896; G07C 9/00904; G07C 9/20; G07C 9/21; G07C 9/27; G07C 9/28
USPC .................................... 235/382; 340/539.13
See application file for complete search history.

(56) References Cited

U.S. PATENT DOCUMENTS

| | | | | |
|---|---|---|---|---|
| 10,713,686 | B2 | 7/2020 | Shiffert et al. | |
| 11,856,474 | B2 | 12/2023 | Ellis et al. | |
| 2015/0181016 | A1* | 6/2015 | Jain | H04W 4/021 455/456.4 |
| 2016/0148127 | A1* | 5/2016 | Harkey | G06Q 10/02 705/5 |
| 2017/0098210 | A1* | 4/2017 | Laracey | G06Q 20/327 |
| 2018/0165675 | A1* | 6/2018 | Isaacson | G06Q 20/342 |
| 2019/0272596 | A1* | 9/2019 | Pancholi | G06K 19/06018 |

(Continued)

OTHER PUBLICATIONS

"Understanding Location-Based Push Notifications with Real Case Examples" Smartpush, Jun. 4, 2023 https://www.smartpush.ai/blog/location-based-pushnotifications/#:~:text=As%20the%20name%20suggests%2C%20geofence%20push%20notifications%20target,once%20the%20people%20are%20in%20your%20targeted%20territory.

(Continued)

*Primary Examiner* — Suezu Ellis
(74) *Attorney, Agent, or Firm* — Kaufman & Canoles, P.C.

(57) ABSTRACT

Systems and methods of providing sign-in at entry to a retail store are performed. In one exemplary embodiment, a method is performed by a wireless device operationally coupled to a network node device and having processing circuitry operable to execute an application that is associated with both a certain user account of a set of user accounts and a set of retail stores. The method includes sending, to the network node device, an indication that includes both the current location of the wireless device and information associated with the certain user account to enable the network node device to initiate sending, to the wireless device over the network, a user account-specific, location-based notification that includes an optically machine readable code, displayed through the application executed by the (Continued)

processing circuitry of the wireless device, to enable entry to a certain retail store of the set of retail stores.

19 Claims, 7 Drawing Sheets

(56) References Cited

U.S. PATENT DOCUMENTS

| | | | | |
|---|---|---|---|---|
| 2019/0320287 | A1* | 10/2019 | Weiss | H04W 4/021 |
| 2020/0184506 | A1* | 6/2020 | Joseph | G06Q 30/0267 |

OTHER PUBLICATIONS

"QR Codes for Paper Invitations" https://rsvpify.com/qrcodes/?msclkid=121c311402301a0f856e545676743c53&utm_source=bing&utm_medium=cpc&utm_campaign=2022%20-%20QR%20Code%20-%20US%20%26%20Canada%20-%20Exact&utm_term=registration%20qr%20code&utm.

"How to Trigger Automation from QR Codes and NFC Tags with Zapier" Gray, Matthew, Apr. 3, 2023 https://zapier.com/blog/zap-qr-nfc/.

* cited by examiner

RETAIL STORE ENTRY AND SIGN-IN SYSTEM USING A LOCATION OF A WIRELESS DEVICE

BACKGROUND

As an alternative and replacement to the traditional cashier-performed checkout model, the self-service or self-checkout model is having an increased impact on retail success. Beyond these models, more advanced self-serve or self-checkout retail models have been proposed in recent years. For instance, a frictionless store model relies on smartphone-related technologies, video tracking systems, and artificial intelligence to provide a type of self-service and self-checkout customer experience. Compared to the cashier-performed checkout and self-service models, the frictionless store model faces more pronounced challenges including the preciseness of checkout transaction recognition and increased exposure to retail shrinkage.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

This disclosure includes exemplary embodiments related to providing a frictionless shopping experience for customers that may not have applications specific to certain retail stores installed on their smartphones or may not be frequent shoppers at those retail stores. Further, this disclosure includes exemplary embodiments related to those consumers that do not have an application specific to a certain retail store installed on their smartphone to enable them to sign-in at that retail store's entrance. Further, this disclosure includes exemplary embodiments related to those consumers who do not shop often or who do not want to have a certain retail store's application installed on their smartphone. For instance, in one exemplary embodiment, a customer enters a geofenced area such as a parking lot proximate a certain retail store or an area proximate an entrance to that retail store, a computer server can track the current location of a customer's smartphone to determine that the customer's smartphone is in that geofenced area. In response, the server can push to the customer's smartphone a quick-response (QR) code to enable the consumer to sign-in at an entry terminal to that retail store using the QR code displayed on the consumer's smartphone. A video tracking system in that retail store can associate the customer with the QR code and can track the customer as he/she moves about the store. Further, the video tracking system can track any retail items obtained by the customer (e.g., placed in a shopping basket) during that store visit. For the checkout transaction, the customer can scan his/her QR code at the checkout kiosk, complete the transaction payment, and then exit the store such as by scanning his/her QR code at an exit terminal.

Figure 1:
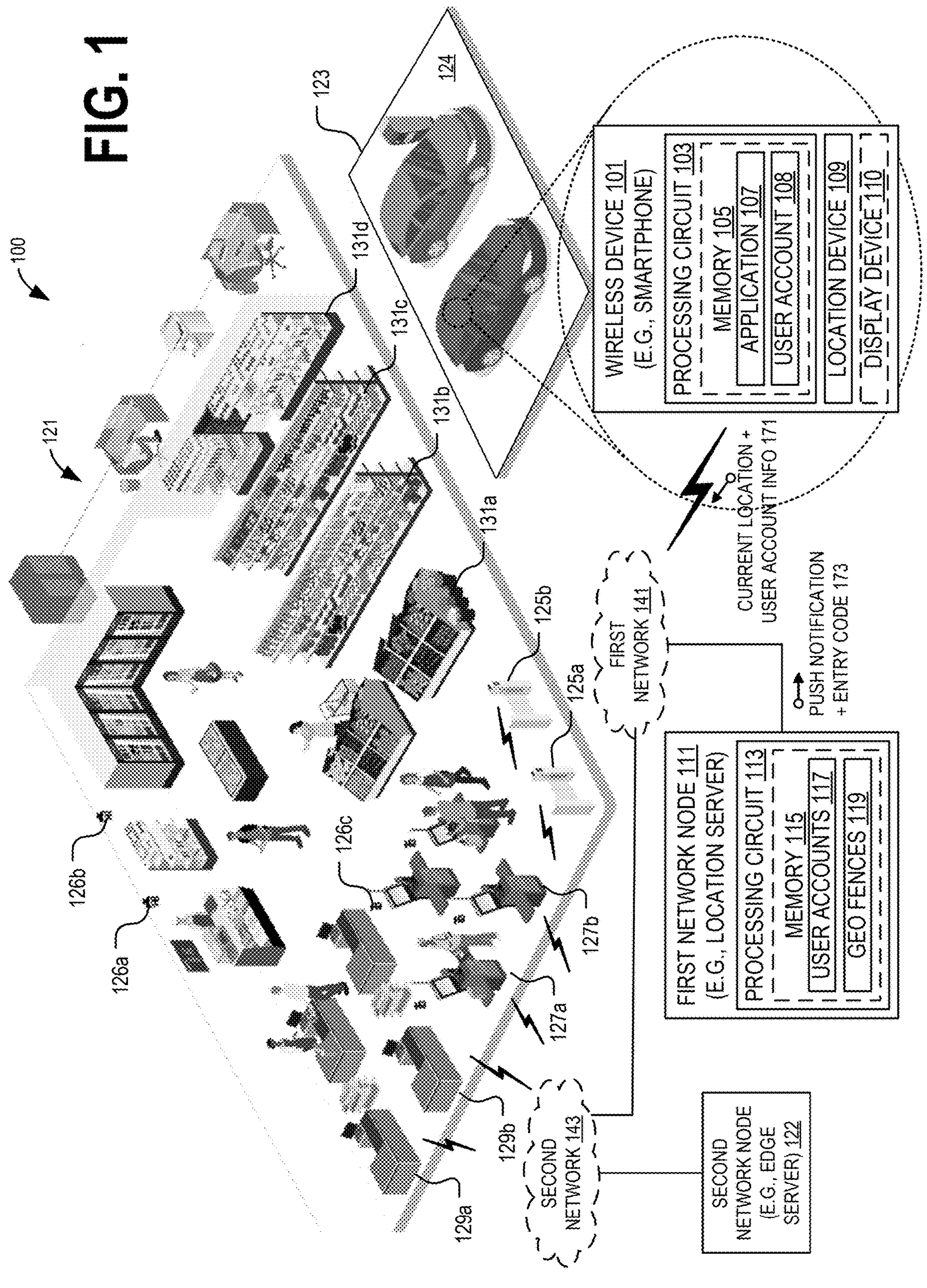
FIG. 1 illustrates one embodiment of a system of performing sign-in at entry to a retail store in accordance with various aspects as described herein.

Furthermore, the exemplary embodiments described herein include improved techniques to enable performing sign-in at entry to a retail store. For example, FIG. 1 illustrates one embodiment of a system 100 of providing sign-in at entry to a retail store 121 in accordance with various aspect as described herein. In FIG. 1, the system 100 includes a wireless device 101 (e.g., smartphone) operationally coupled to a first network node device 111 (e.g., location server) over a first network 141 (e.g., WAN, Internet). The retail store 121 includes a second network node device 122 (e.g., edge server) operationally coupled over a second network 143 (e.g., LAN) to entry/exit gate terminals 125*a,b*, video camera devices 126*a-c* of a vision tracking system (not shown), self-checkout stations 127*a-b*, cashier-performed checkout stations 129*a-b*, shelves 131*a-d* having a set of retail items, the like, or any combination thereof. Further, the first network node 101 can be operationally coupled to the second network node 122 over the first and second networks 141, 143. The retail store 121 can also be associated with a virtual perimeter 123 (e.g., geofence) of a predetermined geographical area 124 proximate the retail store 121. The predetermined geographical area 124 can include any area proximate the retail store 121 such as a parking lot, an entrance to the retail store 121, the like, or any combination thereof. The retail store 121 can be a boutique store, a department store, a supermarket store, a convenience store, a warehouse store, a cashierless store, a frictionless store, the like, or any combination thereof. The wireless device 101 can include processing circuitry 103 operable to execute instructions stored in memory 105 such as associated with application 107. The wireless device 101 can also include a location device 109 (e.g., GPS module) operable to determine a current location of the wireless device 101 and a display device 110 (e.g., touchscreen) operable to display an image and detect a touch. The application 107 can be associated with a certain user account 108 of a set of user accounts 117 and a set of retail stores. In one example, the set of retail stores can include retail stores of the same retail chain (e.g., Target®, Walmart®, Costco®). In another example, the set of retail stores can include retail stores of at least two retail chains. Further, the application 107 can be configured to obtain and output, for display on the display 110, an optically machine-readable code (e.g., QR code, bar code) configured to permit entry to the retail store 121 based on the current location of the wireless device 101 and the certain user account information 108 of the application 107. In addition, the first network node 111 can include processing circuitry 113 operable to execute instructions stored in memory 115 and to store information such as the set of user accounts 117 associated with the application 107 and a set of virtual perimeters 119 (e.g., geofences) of predetermined geographical areas proximate the set of retail stores.

In FIG. 1, the second network node 122 can be configured to improve the operational efficiency and customer experience in the retail store environment 121. The second network node 122 can be configured to process data locally within the retail store 121, reducing latency and improving response times for critical applications such as point of sale (POS) systems, inventory management, and customer relationship management (CRM) tools. Further, the second network node 122 can be configured to collect and analyze data from various sensors and devices deployed throughout the store, including IoT devices, entry/exit gate terminals 125*a,b*, video devices 126*a-c* of the vision tracking system, self-checkout stations 127*a-b*, cashier-performed checkout stations 129*a-b*, surveillance cameras, and the vision tracking system to enable real-time insights into customer behavior, foot traffic patterns, and inventory levels. The second network node 122 can also be configured to utilize digital signage, promotional displays, and interactive kiosks to engage customers such as delivering multimedia content locally, ensuring smooth playback and reducing dependence on external network bandwidth. In addition, the second network node 122 can be configured to process video feeds provided by the video devices 126*a-c*, security cameras and surveillance systems c to the vision tracking system, perform tasks such as facial recognition, license plate recognition and anomaly detection, and generate alerts for security breaches or suspicious activities in real-time. Additionally, the second network node 122 can be configured to track inventory movements in real-time, update inventory databases, and trigger alerts for low stock levels, enabling timely replenishment and reducing out-of-stock situations. The second network node 122 can also enable personalized customer experiences by analyzing historical data and current interactions such as recommending products based on past purchases or browsing behavior, enhancing cross-selling opportunities. The second network node 122 can also operate autonomously to ensure that essential functions such as POS transactions and security monitoring remain uninterrupted.

Each entry/exit gate terminal 125*a,b* can include an optical scanner device operable to scan or capture an image of an optical machine readable code (e.g., QR code, bar code) such as displayed on a display of a wireless device 101 (e.g., smartphone) of a customer to enable entry/exit by that customer to/from the retail store 121. The vision tracking system of the retail store 121 can include the video devices 126*a-c* strategically positioned throughout the retail store 121 to cover all areas where customers may move in the store 121. Further, the vision tracking system can apply advanced computer vision algorithms to video captured by the video devices 126*a-c* to detect and track objects such as products and customers in real-time. Such algorithms may include facial recognition or other identification methods to recognize and track individual customers as they move through the store 121, product recognition algorithms to identify and track products to monitor inventory and customer selections, movement tracking algorithms to monitor the movement of customers and products within the store 121, including picking up items, placing them back, and purchasing decisions. The vision tracking system can also be operationally coupled to the second network node 122 to integrate with store inventory systems and payment systems to track product availability and customer purchases. In addition, the vision tracking system can analyze customer behavior, traffic patterns, popular products, and other data to improve store layout, product placement, and overall customer experience.

Each self-checkout station 127*a-b* can be configured to include a scanner device operable to scan a barcode on retail items or can be configured to enable manually entering retail item codes such as on a touchscreen display device. Each self-checkout station 127*a-b* can also include a bagging area where customers can place scanned items. Further, each self-checkout station 127*a-b* can verify that all items have been scanned and placed correctly to prevent errors or theft. In addition, each self-checkout station 127*a-b* can accept various forms of payment, including credit/debit cards, mobile payment apps, and sometimes cash, can apply coupons or discounts directly at the self-checkout station, can print a receipt after completing the transaction, can apply security features such as weight sensors to detect unscanned items or unexpected changes in weight during bagging, can provide a user interface to guide customers through each step of the checkout process, or the like. Each cashier-performed checkout station 129*a-b* can be configured as a checkout lane manned by store personnel such as cashiers. Further, each checkout station 129*a-b* can be configured to enable customers to bring their items to the cashier, who scans each item using a barcode scanner or manually enters item codes into the system. Each checkout station 129*a-b* can also include a bagging area where, after scanning, the cashier can place the items into bags or containers for the customer. In addition, each checkout station 129*a-b* can also be configured to enable payment such as cash, credit/debit cards, and mobile payments and to present coupons or discounts, which the cashier can scan or enter into the system to apply to the transaction. In addition, each checkout station 129*a-b* can be configured to print a receipt for the customer, which includes details of the purchased items and the total amount paid. Cashiers can provide assistance to customers throughout the checkout process, including answering questions about products, handling returns or exchanges, and providing information on store policies. Cashiers can also be responsible for monitoring security, such as checking for age verification on restricted items (e.g., alcohol, tobacco) and ensuring that all items have been properly scanned and paid for.

In operation, the wireless device 101 can determine that the current location of the wireless device 101 is to be sent. In response, the wireless device 101 can obtain the current location of the wireless device 101 such as by receiving, from the location device 110, the current location of the wireless device 101. Further, the wireless device 101 can obtain information (e.g., account identifier, anonymized account identifier) associated with the certain user account 108 of the set of user accounts 117 of the application 107. The wireless device 101 can then send, to the first network node device 111 over the first network 141, an indication 171 that includes both the current location of the wireless device 101 and the certain user account information. The first network node device 111 can receive the indication 171 and in response, verify that the certain user account information corresponds to one of the set of user accounts 117 of the application 107. The first network node device 111 can determine that the current location of the wireless device 101 corresponds to the certain virtual perimeter 123 proximate the certain retail store 121. The first network node 111 can obtain the notification based on the certain user account information of the application 107 and the certain retail store 121. The first network node 111 can also generate the optically machine-readable code based on the certain user account information and the certain retail store 121. Further, the first network node 111 can format the notification to include the entry code. The first network node 111 can then initiate sending (e.g., push), to the wireless device 101 over the network 141, an indication 173 that includes the notification having the entry code. The wireless device 101 can receive the indication 173 and in response, can obtain the entry code from the notification. The wireless device 101 can determine that the entry code is to be displayed on the display device 110 to enable entry to the certain retail store 121 such as at the entry apparatus 125*a, b* at the entrance to the retail store 121. For instance, a scan device of the entry apparatus 125*a,b* can scan the entry code displayed on the wireless device 101 to enable entry to the retail store 121.

In FIG. 1, the wireless device 101 can refer to a device capable, configured, arranged and/or operable to communicate wirelessly with the network nodes 111, 122 and/or other wireless devices over the networks 141, 143. Communicating wirelessly may involve transmitting and/or receiving wireless signals using electromagnetic waves, radio waves, infrared waves, and/or other types of signals suitable for conveying information through air. In some embodiments, the wireless device 101 may be configured to transmit and/or receive information without direct human interaction. For instance, the wireless device 101 may be designed to transmit information such as a current location of that wireless device to the first network node 111 on a predetermined schedule, on a periodic bases, when triggered by an internal or external event, or in response to requests from the network. Examples of the wireless device 101 include, but are not limited to, a smartphone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, and the like.

Figure 2A:
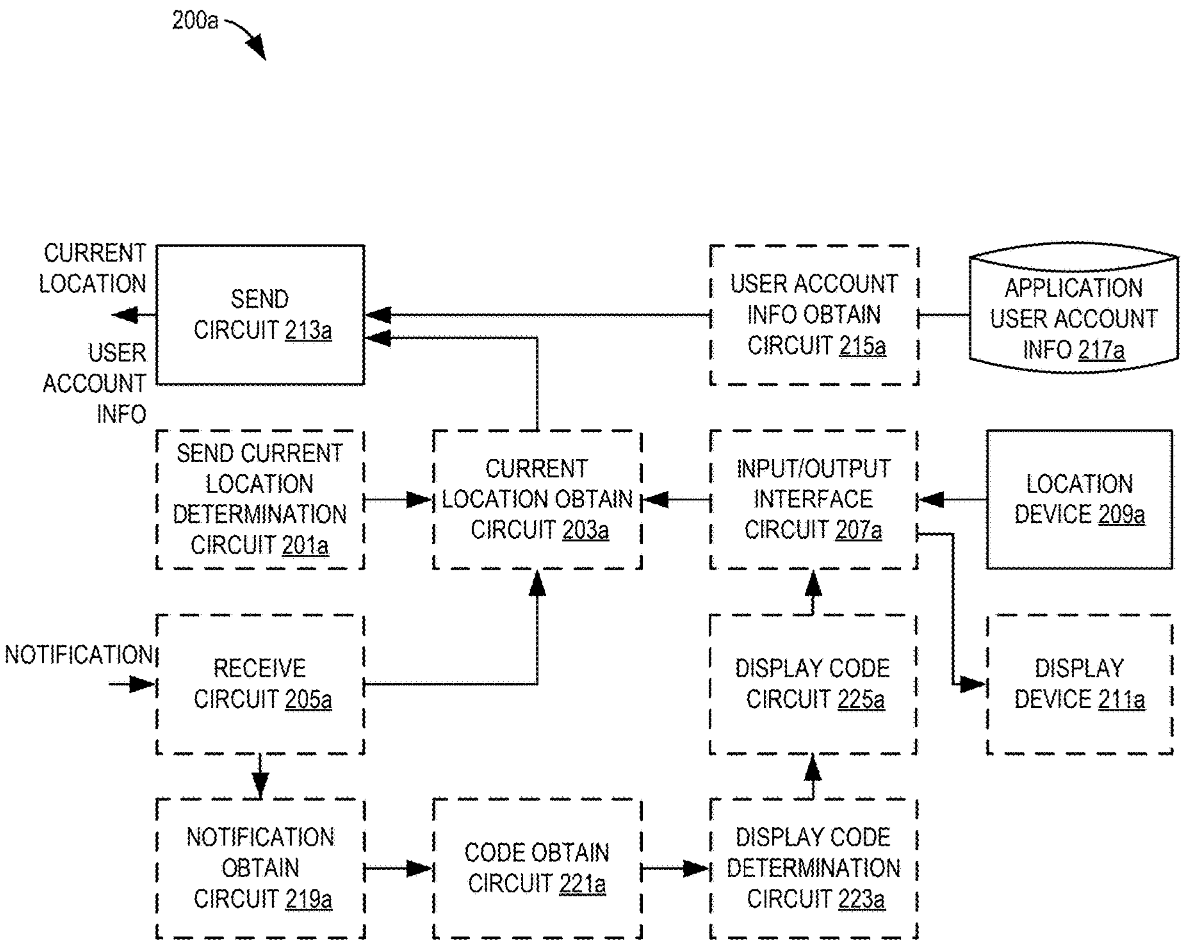
FIG. 2A illustrates one embodiment of a wireless device in accordance with various aspects as described herein.

FIG. 2A illustrates one embodiment of a wireless device 200*a* in accordance with various aspects as described herein. In FIG. 2A, the device 200*a* implements various functional means, units, or modules (e.g., via the processing circuitry 301*a* in FIG. 3A, via the processing circuitry 501 in FIG. 5, via software code, or the like), or circuits. In one embodiment, these functional means, units, modules, or circuits (e.g., for implementing the method(s) described herein) may include for instance: a send current location determination circuit 201*a* operable to send information such as a current location of the wireless device 200*a*; a current location obtain circuit 203*a* operable to obtain a current location of the wireless device 200*a*; a receive circuit 205*a* operable to receive information such as a notification having an optically machine readable code; an input/output interface circuit 207*a* operable to communicate with various devices of the wireless device 200*a* such as a location device 209*a* and a display device 211*a*; a send circuit 213*a* operable to send information such as the current location of the wireless device 200*a* and user account information 217*a* of the application; a user account information obtain circuit 215*a* operable to obtain the user account information 217*a* of the application; a notification obtain circuit 219*a* operable to obtain a notification having a optically machine readable code; a code obtain circuit 221*a* operable to obtain the code from the obtained notification; a display code determination circuit 223*a* operable to determine whether to display the code; and/or a display code circuit 225*a* operable to display the code on a display of the wireless device 200*a.*

Figure 2B:
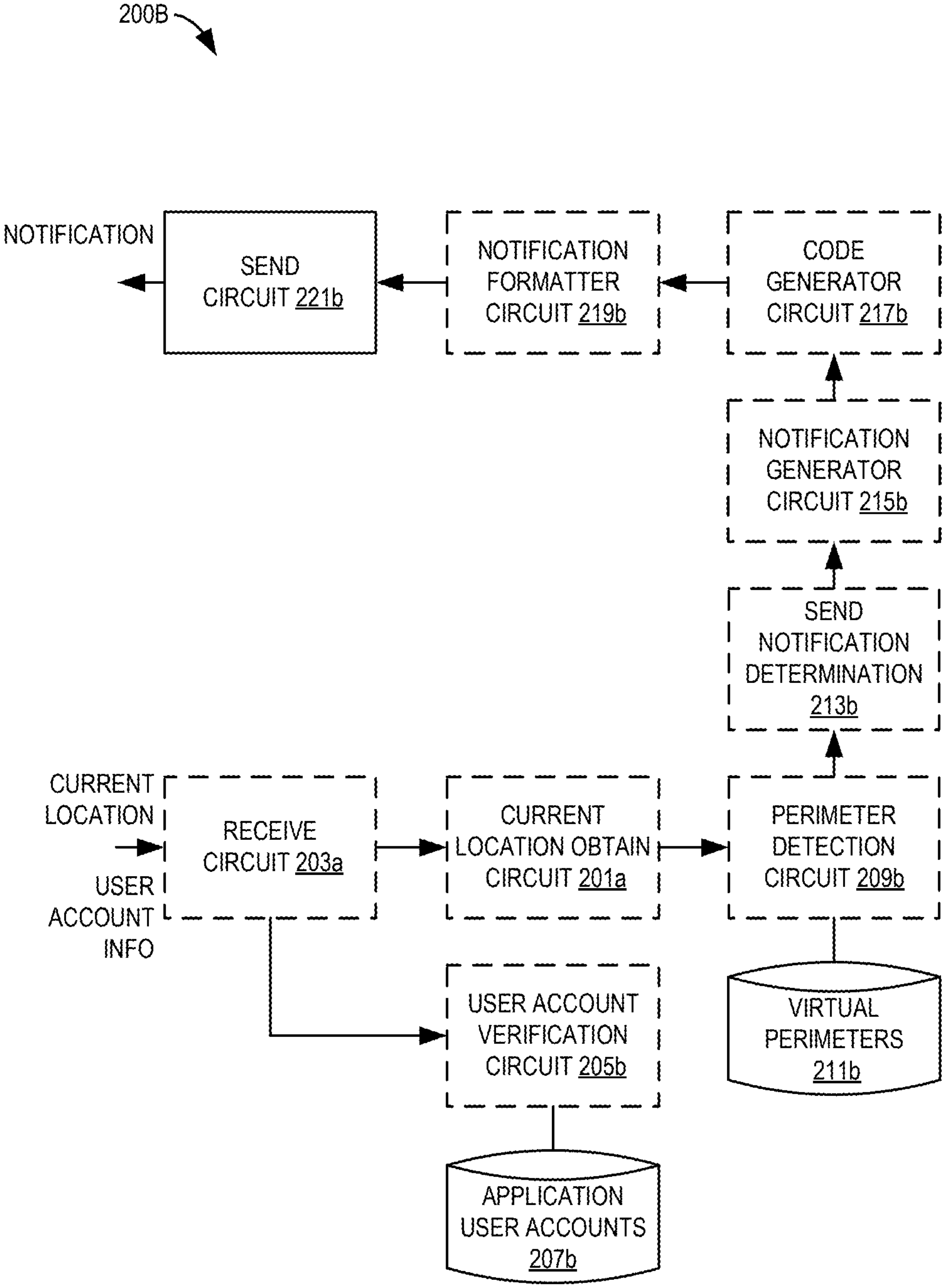
FIG. 2B illustrates one embodiment of a network node device in accordance with various aspects as described herein.

FIG. 2B illustrates one embodiment of a network node device 200*b* in accordance with various aspects as described herein. In FIG. 2B, the device 200*b* implements various functional means, units, or modules (e.g., via the processing circuitry 301*b* in FIG. 3B, via the processing circuitry 501 in FIG. 5, via software code, or the like), or circuits. In one embodiment, these functional means, units, modules, or circuits (e.g., for implementing the method(s) described herein) may include for instance: a current location obtain circuit 201*b* operable to obtain a current location of the wireless device; a receive circuit 203*a* operable to receive information such as the current location of the wireless device and user account information of the application; a user account verification circuit 205*b* operable to verify the user account information of the application based on a database 207*b* having a set of user accounts of the application; a geographical area determination circuit 209*b* operable to determine whether the current location of the wireless device corresponds to one of the set of virtual perimeters 211*b* proximate the set of retail stores; a send notification determination circuit 213*b* operable to determine whether to send the notification having the optically machine readable code; a notification determination circuit 215*b* operable to determine the notification based on the current location of the wireless device and the certain user account information of the application; a code generator circuit 217*b* operable to generate an optical machine readable code based on the current location of the wireless device and the certain user account information of the application; a notification formatter circuit 219*b* operable to format the notification to include the code; and/or a send circuit 221*b* operable to send information such as the notification having the code.

Figure 3A:
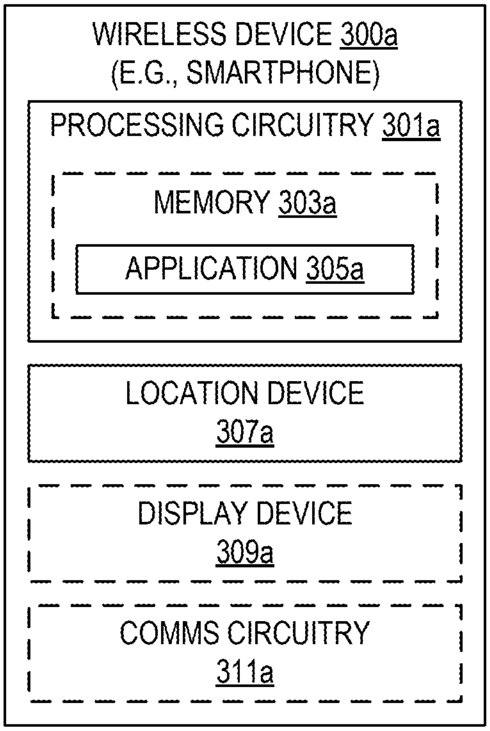
FIG. 3A illustrates another embodiment of a wireless device in accordance with various aspects as described herein.

FIG. 3A illustrates another embodiment of a wireless device 300*a* in accordance with various aspects as described herein. As shown, the device 300*a* includes processing circuitry 301*a*, a location device 307*a*, a display device 309*a* communication circuitry 311*a*, the like, or any combination thereof. The location device 307*a* (e.g., GPS device) is configured to provide a current location of the wireless device 300*a*. The display device 309*a* is configured to display an image. The communication circuitry 311*a* is configured to transmit and/or receive information to and/or from one or more other nodes (e.g., via any communication technology). The processing circuitry 301*a* is configured to perform processing described above, such as by executing instructions stored in memory 303*a* such as associated with application 305*a*. The processing circuitry 301*a* in this regard may implement certain functional means, units, or modules.

Figure 3B:
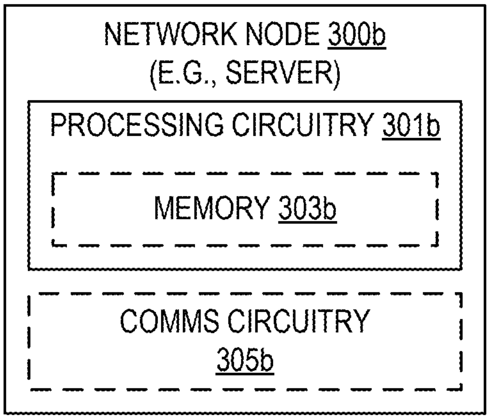
FIG. 3B illustrates another embodiment of a network node device in accordance with various aspects as described herein.

FIG. 3B illustrates another embodiment of a network node device 300*b* in accordance with various aspects as described herein. As shown, the device 300*b* includes processing circuitry 301*b* and communication circuitry 311*b*. The communication circuitry 305*b* is configured to transmit and/or receive information to and/or from one or more other nodes (e.g., via any communication technology). The processing circuitry 301*b* is configured to perform processing described above, such as by executing instructions stored in memory 303*b*. The processing circuitry 301*a* in this regard may implement certain functional means, units, or modules.

Figure 4A:
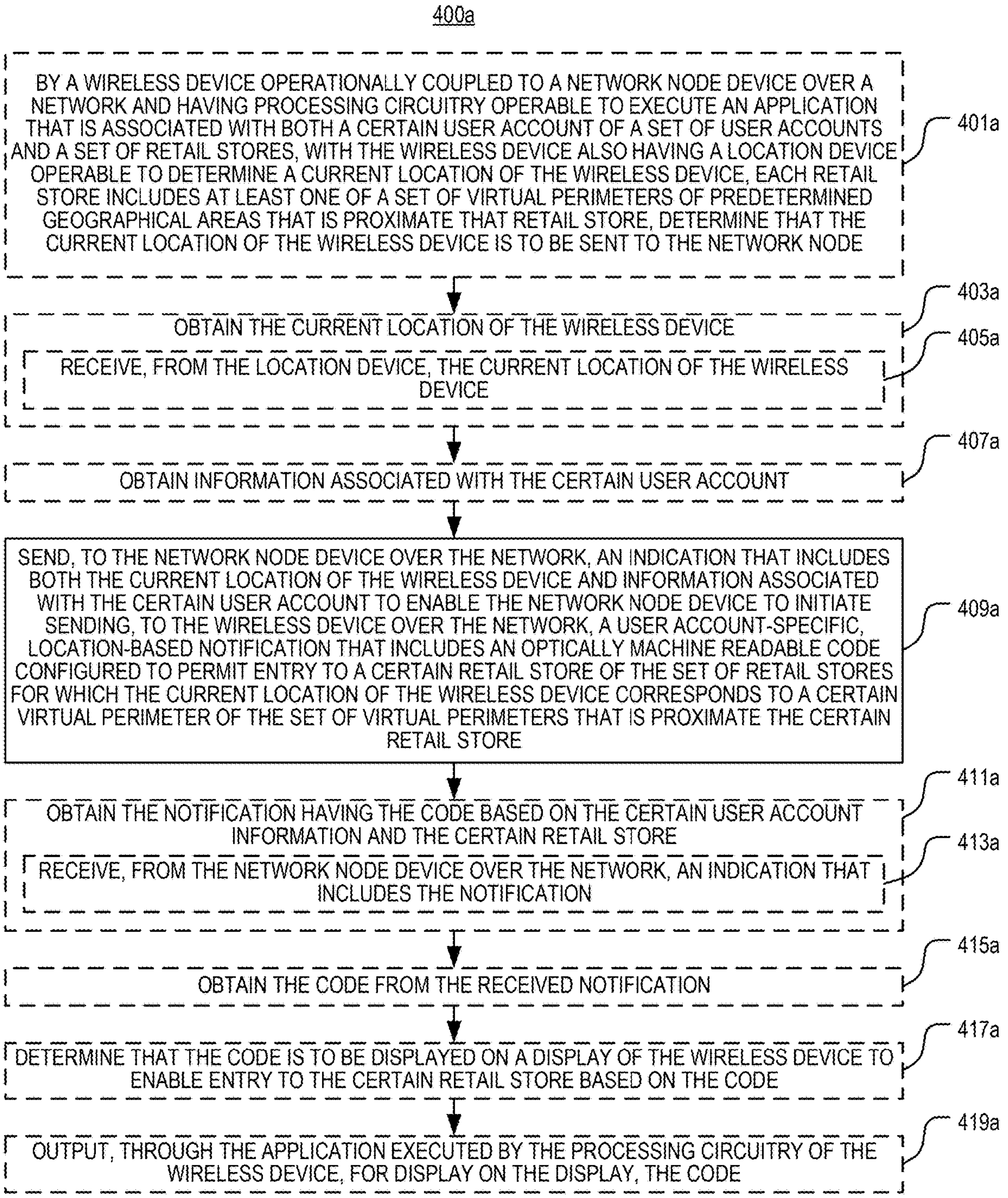
FIG. 4A illustrates one embodiment of a method performed by a wireless device of providing sign-in at entry to a retail store in accordance with various aspects as described herein.

FIG. 4A illustrates one embodiment of a method 400*a* performed by a wireless device of providing sign-in at entry to a retail store in accordance with various aspects as described herein. In FIG. 4A, the method 400*a* may start, for instance, at block 401*a* where it may include determining that the current location of the wireless device is to be sent to the network node. At block 403*a*, the method 400*a* may include obtaining the current location of the wireless device. At block 405*a*, the method 400*a* may include receiving, from the location device, the current location of the wireless device. At block 407*a*, the method 400*a* may include obtaining information associated with the certain user account. At block 409*a*, the method 400*a* includes sending, to the first network node device over the network, an indication that includes both the current location of the wireless device and the information associated with the certain user account to enable the network node device to initiate sending, to the wireless device over the network, a user account-specific, location-based notification that includes an optically machine readable code configured to permit entry to a certain retail store of the set of retail stores for which the current location of the wireless device corresponds to a certain virtual perimeter proximate the certain retail store. At block 411*a*, the method 400*a* may include obtaining the notification based on the certain user account information and the certain retail store. At block 413*a*, the method 400*a* receiving, from the network node device over the network, an indication that includes the notification having the code. At block 415*a*, the method 400*a* may include obtaining the code from the notification. At block 417*a*, the method 400*a* may include determining that the code is to be displayed on a display of the wireless device to enable entry to the certain retail store based on the code. At block 419*a*, the method 400*a* may include outputting, through the application executed by the processing circuitry of the wireless device, for display on the display, the code.

Figure 4B:
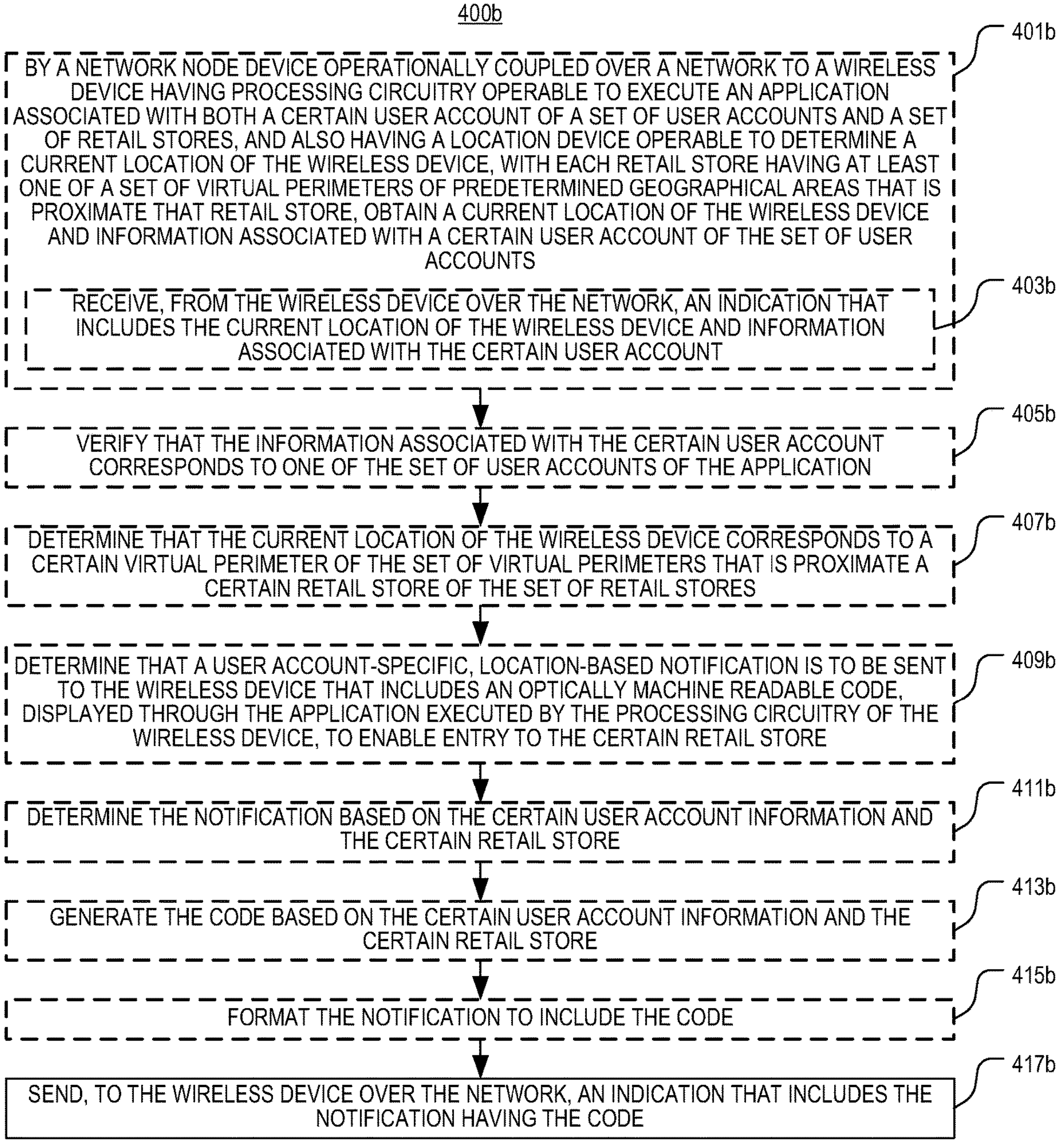
FIG. 4B illustrates one embodiment of a method performed by a network node device of providing sign-in at entry to a retail store in accordance with various aspects as described herein.

FIG. 4B illustrates one embodiment of a method 400*b* performed by a network node device of providing sign-in at entry to a retail store in accordance with various aspects as described herein. In FIG. 4B, the method 400*b* may start, for instance, at block 401*b* where it may include obtaining a current location of the wireless device and information associated with a certain user account of the set of user accounts of the application. At block 403*b*, the method 400*b* may include receiving, from the wireless device over the network, an indication that includes the current location of the wireless device and information associated with the certain user account of the application. At block 405*b*, the method 400*b* may include verifying that the information associated with the certain user account of the application corresponds to one of the set of user accounts of the application. At block 407*b*, the method 400*b* may include determining that the current location of the wireless device corresponds to a certain virtual perimeter of the set of virtual perimeters that is proximate a certain retail store of the set of retail stores. At block 409*b*, the method 400*b* may include determining that a user account-specific, location-based notification is to be sent to the wireless device that includes an optically machine readable code, displayed through the application executed by the processing circuitry of the wireless device, to enable entry to a certain retail store of the set of retail stores. At block 411*b*, the method 400*b* may include determining the notification based on the certain user account information and the certain retail store. At block 413*b*, the method 400*b* may include generating the code based on the certain user account information and the certain retail store. At block 415*b*, the method 400*b* may include formatting the notification to include the code. At block 417*b*, the method 400*b* includes sending, to the wireless device over the network, an indication that includes the notification.

Figure 5:
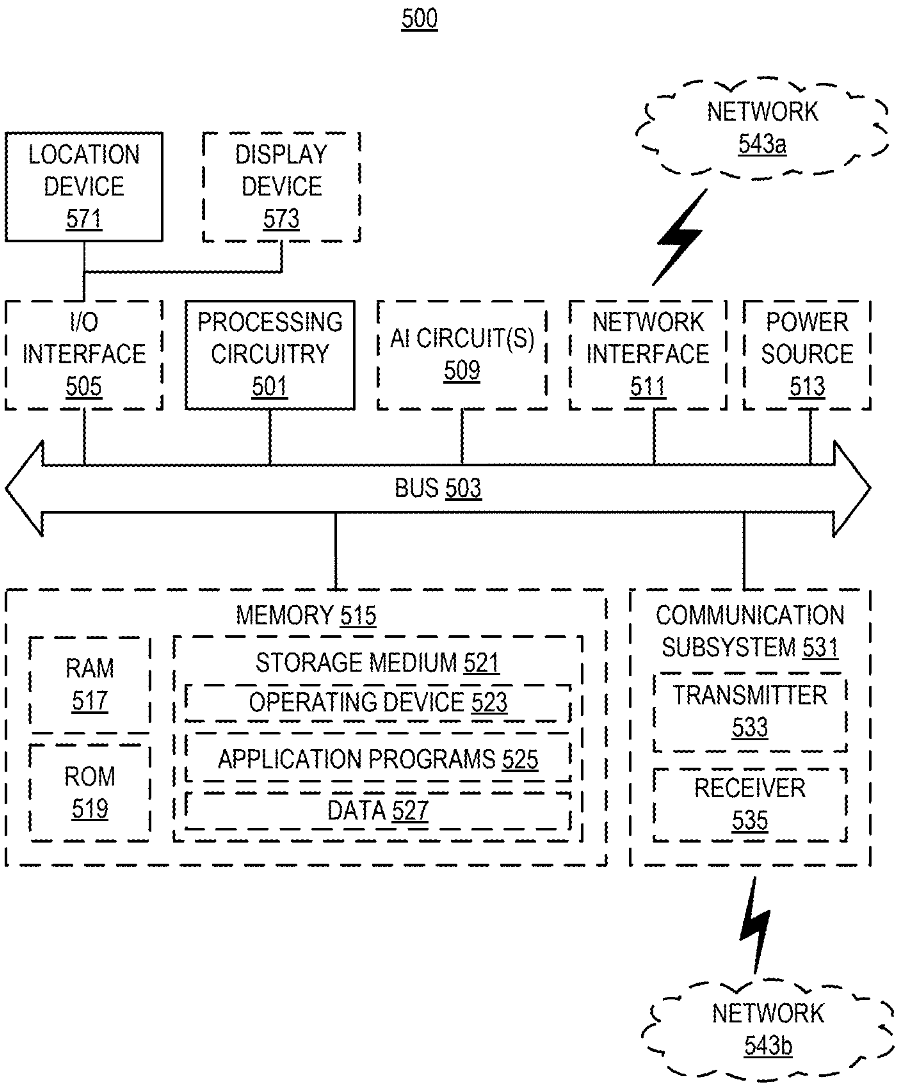
FIG. 5 illustrates another embodiment of a device such as a wireless device or a network node device in accordance with various aspects as described herein.

FIG. 5 illustrates another embodiment of a device 500 such as a wireless device or a network node device in accordance with various aspects as described herein. In FIG. 5, device 500 includes processing circuitry 501 that is operatively coupled to input/output interface 505, artificial intelligence circuit 509, network connection interface 511, power source 513, memory 515 including random access memory (RAM) 517, read-only memory (ROM) 519, and storage medium 521 or the like, communication subsystem 531, and/or any other component, or any combination thereof.

The input/output interface 505 may be configured to provide a communication interface to an input device, output device, or input and output device. The device 500 may be configured to use an input/output device via input/output interface 505 such as the location device 571 (e.g., GPS module) and the display device 573 (e.g., touchscreen). An output device may use the same type of interface port as an input device. For example, a USB port may be used to provide input to and output from the device 500. The output device may be a speaker, a sound card, a video card, a display, a monitor, a printer, an actuator, an emitter, a smartcard, another output device, or any combination thereof. The device 500 may be configured to use an input device via input/output interface 505 to allow a user to capture information into the device 500. The input device may include a touch-sensitive or presence-sensitive display, an optical sensor (e.g., a digital camera, a digital video camera, a web camera, etc.), a location device, a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof.

In FIG. 5, storage medium 521 may include operating system 523, application program 525, data 527, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the artificial intelligence circuit 509 may be configured to learn to perform tasks by considering examples. In FIG. 5, the network connection interface 511 may be configured to provide a communication interface to network 543*a*. The network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers.

The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500*a-b* to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543*b* using the communication subsystem 531. The network 543*a* and the network 543*b* may be the same network or networks or different network or networks. The communication subsystem 531 may be configured to include one or more transceivers used to communicate with the network 543*b*. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired and/or wireless networks such as a local-area network (LAN), a wide-area network (WAN), a computer network, a wireless network, a telecommunications network, another like network or any combination thereof. For example, the network 543*b* may be a cellular network, a Wi-Fi network, and/or a near-field network. The power source 513 may be configured to provide alternating current (AC) or direct current (DC) power to components of the device 500*a-b*.

The features, benefits and/or functions described herein may be implemented in one of the components of the device 500 or partitioned across multiple components of the device 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by a wireless device operationally coupled to a network node device over a network and having processing circuitry operable to execute an application that is associated with both a certain user account of a set of user accounts and a set of retail stores. Further, the wireless device includes a location device operable to determine a current location of the wireless device. Each retail store includes at least one of a set of virtual perimeters of predetermined geographical areas proximate that retail store. The method includes sending, to the network node device over the network, an indication that includes both the current location of the wireless device and information associated with the certain user account to enable the network node device to initiate sending, to the wireless device over the network, a user account-specific, location-based notification that includes an optically machine readable code configured to permit entry to a certain retail store of the set of retail stores for which the current location of the wireless device corresponds to a certain virtual perimeter of the set of virtual perimeters that is proximate the certain retail store, with the wireless device being operable to display the code through the application executed by the processing circuitry of the wireless device.

In another exemplary embodiment, the method further includes determining that the current location of the wireless device is to be sent to the network node device and obtaining the current location of the wireless device.

In another exemplary embodiment, the method further includes receiving, from the location device of the wireless device, the current location of the wireless device.

In another exemplary embodiment, the method further includes obtaining the information associated with the certain user account.

In another exemplary embodiment, the method further includes obtaining the notification based on the certain user account information and the certain retail store.

In another exemplary embodiment, the method further includes receiving, from the network node device over the network, an indication that includes the notification. In addition, the network node device is further operable to determine that the current location of the wireless device corresponds to certain virtual perimeter proximate the certain retail store.

In another exemplary embodiment, the method further includes determining that a visual representation of the code is to be displayed on a display of the wireless device to enable entry to the certain retail store responsive to the received notification.

In another exemplary embodiment, the method further includes generating the visual representation of the code and outputting, through the application executed by the processing circuitry of the wireless device, for display on the display of the wireless device, the visual representation of the code.

In another exemplary embodiment, the method further includes determining that a visual representation of the code is to be displayed on a display of the wireless device to enable a checkout transaction in the certain retail store, generating the visual representation of the code and outputting, through the application executed by the processing circuitry of the wireless device, for display on the display of the wireless device, the visual representation of the code.

In another exemplary embodiment, the code is visually represented by a two-dimensional matrix bar code.

In one exemplary embodiment, a wireless device is operationally coupled to a network node device over a network and having processing circuitry operable to execute an application that is associated with both a certain user account of a set of user accounts and a set of retail stores. The wireless device further includes a location device operable to determine a current location of the wireless device. Each retail store includes at least one of a set of virtual perimeters of predetermined geographical areas proximate that retail store. The wireless device also includes a memory containing instructions executable by the processing circuitry whereby the processing circuitry is configured to send, to the network node device over the network, an indication that includes both the current location of the wireless device and information associated with the certain user account to enable the network node device to initiate sending, to the wireless device over the network, a user account-specific, location-based notification that includes an optically machine readable code configured to permit entry to a certain retail store of the set of retail stores for which the current location of the wireless device corresponds to a certain virtual perimeter of the set of virtual perimeters that is proximate the certain retail store, with the wireless device being operable to display the code through the application executed by the processing circuitry of the wireless device.

In one exemplary embodiment, a wireless device includes a display operable to display an image, a location device operable to obtain a current location of the wireless device, a memory storing an application associated with both a certain user account of a set of user accounts and a set of retail stores, and a processing circuitry operationally coupled to the location device and the memory. Each retail store includes at least one of a set of virtual perimeters of predetermined geographical areas proximate that retail store. Further, the memory includes instructions executable by the processing circuitry, whereby the processing circuitry is configured to send, to the network node device over the network, an indication that includes both the current location of the wireless device and information associated with the certain user account to enable the network node device to initiate sending, to the wireless device over the network, a user account-specific, location-based notification that includes an optically machine readable code configured to permit entry to a certain retail store of the set of retail stores for which the current location of the wireless device corresponds to a certain virtual perimeter of the set of virtual perimeters that is proximate the certain retail store, with the wireless device being operable to display the code through the application executed by the processing circuitry of the wireless device.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:

by a wireless device operationally coupled to a network node device over a network and having processing circuitry operable to execute an application that is associated with both a certain user account of a set of user accounts and a set of retail stores, the wireless device also having a location device operable to determine a current location of the wireless device, with each retail store having at least one of a set of virtual perimeters of predetermined geographical areas that is proximate that retail store, sending, to the network node device over the network, an indication that includes both the current location of the wireless device and information associated with the certain user account to enable the network node device to initiate sending, to the wireless device over the network, a user account-specific, location-based notification that includes an optically machine readable code configured to permit entry to a certain retail store of the set of retail stores for which the current location of the wireless device corresponds to a certain virtual perimeter of the set of virtual perimeters that is proximate the certain retail store, with the wireless device being operable to display the optically machine readable code through the application executed by the processing circuitry of the wireless device.

2. The method of claim 1, wherein sending the indication is responsive to:

determining, by the processing circuitry, that the current location of the wireless device is to be sent to the network node device; and obtaining, by the processing circuitry, the current location of the wireless device.

3. The method of claim 2, wherein the obtaining the current location of the wireless device comprises:

receiving, by the processing circuitry, from the location device of the wireless device, the current location of the wireless device.

4. The method of claim 1, further comprising:

obtaining the information associated with the certain user account.

5. The method of claim 1, further comprising:

obtaining the notification based on the certain user account information and the certain retail store.

6. The method of claim 1, further comprising:

receiving, from the network node device over the network, an indication that includes the notification, wherein the network node device is further operable to determine that the current location of the wireless device corresponds to the certain virtual perimeter proximate the certain retail store.

7. The method of claim 6, further comprising:

determining that a visual representation of the optically machine readable code is to be displayed on a display of the wireless device to enable entry to the certain retail store responsive to the received notification.

8. The method of claim 7, further comprising:

generating the visual representation of the optically machine readable code; and outputting, through the application executed by the processing circuitry of the wireless device, for display on the display of the wireless device, the visual representation of the optically machine readable code.

9. The method of claim 1, further comprising:

determining that a visual representation of the optically machine readable code is to be displayed on a display of the wireless device to enable a checkout transaction in the certain retail store;

generating the visual representation of the optically machine readable code; and outputting, through the application executed by the processing circuitry of the wireless device, for display on the display of the wireless device, the visual representation of the optically machine readable code.

10. The method of claim 1, wherein the optically machine readable code is visually represented by a two-dimensional matrix bar code.

11. A wireless device, comprising:

with the wireless device being operationally coupled to a network node device over a network and having processing circuitry operable to execute an application that is associated with both a certain user account of a set of user accounts and a set of retail stores, the wireless device also having a location device operable to determine a current location of the wireless device, with each retail store having at least one of a set of virtual perimeters of predetermined geographical areas that is proximate that retail store; and wherein the wireless device further comprises a memory, the memory containing instructions executable by the processing circuitry whereby the processing circuitry is configured to:

send, to the network node device over the network, an indication that includes both the current location of the wireless device and information associated with the certain user account to enable the network node device to initiate sending, to the wireless device over the network, a user account-specific, location-based notification that includes an optically machine readable code configured to permit entry to a certain retail store of the set of retail stores for which the current location of the wireless device corresponds to a certain virtual perimeter of the set of virtual perimeters that is proximate the certain retail store, with the wireless device being operable to display the optically machine readable code through the application executed by the processing circuitry of the wireless device.

12. The device of claim 11, wherein prior to sending the indication, the processing circuitry is further configured to:

determine that the current location of the wireless device is to be sent to the network node device; and obtain the current location of the wireless device.

13. The device of claim 12, wherein to obtain the current location of the wireless device, the processing circuitry is configured to:

receive, from the location device of the wireless device, the current location of the wireless device.

14. The device of claim 11, wherein the network node device is operable to determine that the current location of the wireless device corresponds to the certain virtual perimeter proximate the certain retail store.

15. The device of claim 11, wherein the memory contains instructions executable by the processing circuitry whereby the processing circuitry is further configured to:

obtain the notification based on the certain user account information and the certain retail store.

16. The device of claim 11, wherein the memory contains instructions executable by the processing circuitry whereby the processing circuitry is further configured to:

receive, from the network node device over the network, an indication that includes the notification, wherein the network node device is further operable to determine that the current location of the wireless device corresponds to the certain virtual perimeter proximate the certain retail store.

17. The device of claim 11, wherein the memory contains instructions executable by the processing circuitry whereby the processing circuitry is further configured to:

determine that a visual representation of the optically machine readable code is to be displayed on a display of the wireless device;

generate the visual representation of the optically machine readable code; and output, through the application executed by the processing circuitry of the wireless device, for display on the display of the wireless device, the visual representation of the optically machine readable code to enable a second network node device co-located at the certain retail store to obtain the visual representation of the optically machine readable code so as to enable entry to the certain retail store.

18. The device of claim 11, wherein the optically machine readable code is visually represented by a two-dimensional matrix bar code.

19. A wireless device, comprising:

a display operable to display an image;

a location device operable to obtain a current location of the wireless device;

a memory storing an application associated with both a certain user account of a set of user accounts and a set of retail stores, with each retail store having at least one of a set of virtual perimeters of predetermined geographical areas that is proximate that retail store; and a processing circuitry operationally coupled to the location device and the memory, with the memory containing instructions executable by the processing circuitry, whereby the processing circuitry is configured to:

send, to a network node device over a network, an indication that includes both the current location of the wireless device and information associated with the certain user account to enable the network node device to initiate sending, to the wireless device over the network, a user account-specific, location-based notification that includes an optically machine readable code configured to permit entry to a certain retail store of the set of retail stores for which the current location of the wireless device corresponds to a certain virtual perimeter of the set of virtual perimeters that is proximate the certain retail store, with the wireless device being operable to display the optically machine readable code through the application executed by the processing circuitry of the wireless device.

* * * * *